(12) United States Patent
Stonich et al.

(10) Patent No.: US 6,598,899 B2
(45) Date of Patent: Jul. 29, 2003

(54) INFLATABLE SEAT BELT USING MEMS DEVICES

(75) Inventors: Ivan L. Stonich, Hermosa Beach, CA (US); Lee D. Bergerson, Fountain Valley, CA (US)

(73) Assignee: TRW Inc., Lyndhurst, OH (US)

( * ) Notice: Subject to any disclaimer, the term of this patent is extended or adjusted under 35 U.S.C. 154(b) by 48 days.

(21) Appl. No.: 09/933,926

(22) Filed: Aug. 21, 2001

(65) Prior Publication Data

US 2003/0038463 A1 Feb. 27, 2003

(51) Int. Cl.$^7$ .......................... B60R 21/28; B60R 21/18
(52) U.S. Cl. ...................... 280/733; 280/735; 280/736; 280/741
(58) Field of Search ................................ 280/733, 736, 280/741, 735; 102/202.5

(56) References Cited

U.S. PATENT DOCUMENTS

| | | | |
|---|---|---|---|
| 2,911,504 A | 11/1959 | Cohn | |
| 3,503,814 A | 3/1970 | Helms, Jr. et al. | |
| 5,167,426 A | 12/1992 | Mihm et al. | |
| 5,346,250 A | 9/1994 | Kamiyama | |
| 5,880,921 A | 3/1999 | Tham et al. | |
| 5,984,350 A | 11/1999 | Hagan et al. | |
| 6,015,599 A | * 1/2000 | Keller et al. | 428/34.4 |
| 6,070,531 A | * 6/2000 | Hansen et al. | 102/202.5 |
| 6,167,809 B1 | * 1/2001 | Robinson et al. | 102/235 |
| 6,173,650 B1 | * 1/2001 | Garvick et al. | 102/202.5 |
| 6,321,654 B1 | * 11/2001 | Robinson | 102/251 |
| 6,431,594 B1 | 8/2002 | Swann et al. | |

FOREIGN PATENT DOCUMENTS

EP 0903487 11/1999

OTHER PUBLICATIONS

Tayebi, Abdelkader K. http://www.people.cornell.edu/pages/akt1/what.html " MEMS Virtual Learning Cybercent and E(du) Pages, So What Are these MEMS" Copyright 1998.*
Janson et al., MEMS, Microengineering and Aerospace Systems –AiAA 99–3802 Copyright 1999.*
U.S. patent application Ser. No. 09/755,704, Filed Jan. 5, 2001; entitled Air Bag Inflators.
U.S. patent application Ser. No. 09/756,409, Filed Jan. 8, 2001; entitled Seat Belt Webbing Pretensioner Using MEMS Devices.
U.S. patent application Ser. No. 09/818,129, Filed Mar. 27, 2001; entitled Air Bag Inflators.
U.S. patent application Ser. No. 09/843,546, filed Apr. 26, 2001, entitled "Initiators For Air Bag Inflators".
Article, D. Lewis, et al., "Digital Micropulsion", Sensors and Actuators A; Physical, vol. 80, No.2, Elsevier, Mar., 2000, p. 143, 154.

* cited by examiner

Primary Examiner—Paul N. Dickson
Assistant Examiner—Ruth Ilan
(74) Attorney, Agent, or Firm—Tarolli, Sundheim, Covell & Tummino L.L.P.

(57) ABSTRACT

A seat belt system (13) includes a seat belt (19) having an inflatable portion (32). The system (13) further comprises at least one microelectromechanical device (MEMS) device (120) connected in fluid communication with the inflatable portion (32) of the seat belt (19) and energizable to supply inflation fluid to inflate the inflatable portion (32) of the seat belt.

26 Claims, 4 Drawing Sheets

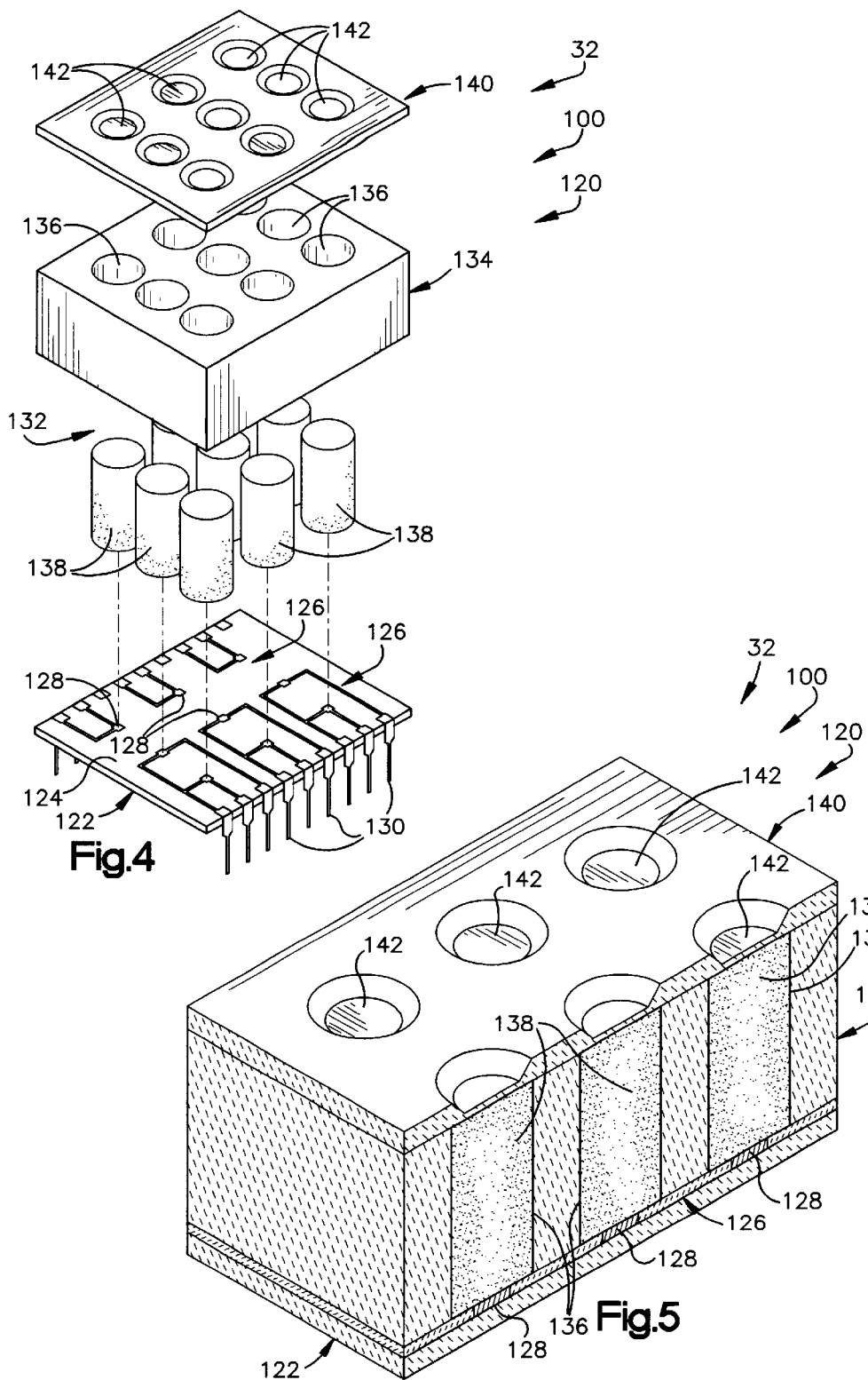

INFLATABLE SEAT BELT USING MEMS DEVICES

BACKGROUND OF THE INVENTION

1. Technical Field

The present invention relates to inflatable vehicle seat belt webbing. In particular, the present invention relates to a fluid source for inflating a length of vehicle seat belt webbing.

2. Description of the Prior Art

A typical vehicle seat belt system includes a length of belt webbing wound on a spool of a seat belt webbing retractor. The belt webbing is extensible about a vehicle occupant to restrain the occupant. The belt webbing spool rotates in a belt withdrawal direction as the occupant withdraws belt webbing from the retractor. A rewind spring is connected with the belt webbing spool and biases the belt webbing spool for rotation in an opposite belt retraction direction.

It is known to use a pyrotechnic device, such as a gas generating initiator, to provide fluid under pressure for inflating a bladder within the belt webbing during a vehicle collision. The fluid is used to transform a portion of the belt webbing into a cushion for tensioning the belt webbing against the occupant and increasing the surface area over which the force with which the belt webbing restrains the occupant during the collision is applied. The bladder may also emerge from the seat belt to act as a secondary air bag device.

SUMMARY OF THE INVENTION

The present invention is a vehicle seat belt system comprising a seat belt for helping to protect a vehicle occupant. The seat belt includes an inflatable portion. The system further comprises at least one microelectromechanical device (MEMS device) connected in fluid communication with the inflatable portion of the seat belt and energizable to supply inflation fluid to inflate the inflatable portion of the seat belt.

BRIEF DESCRIPTION OF THE DRAWINGS

Further features of the present invention will become apparent to one skilled in the art to which the present invention relates from reading the following specification with reference to the accompanying drawings, in which:

FIG. 4 is an exploded perspective view of a MEMS device that forms part of the seat belt of FIGS. 3A and 3B;

FIG. 5 is a partial perspective view of the MEMS device of FIG. 4;

DESCRIPTION OF PREFERRED EMBODIMENTS OF THE INVENTION

Figure 1:
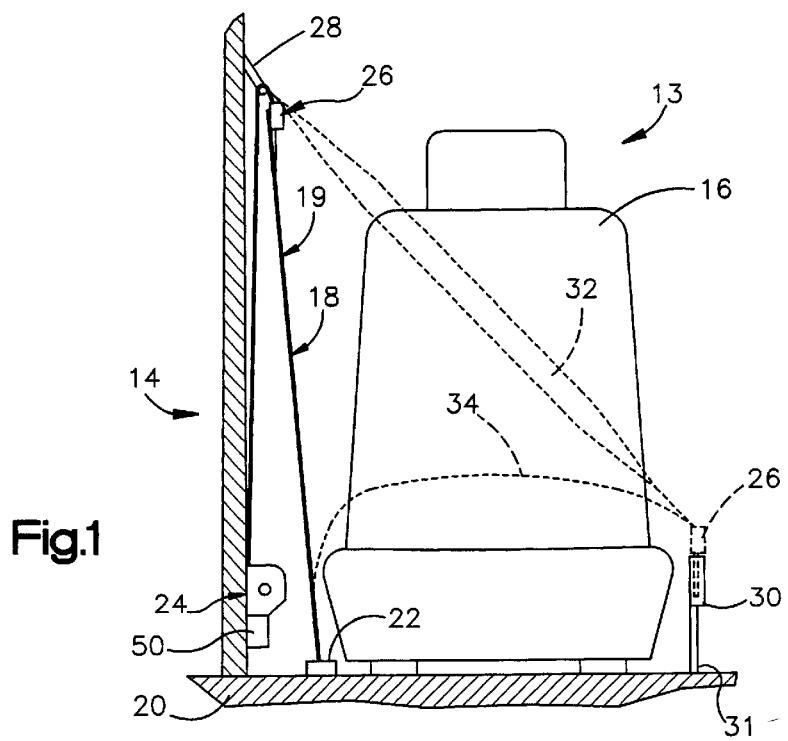
FIG. 1 is a schematic illustration of a vehicle seat belt system including an inflatable seat belt in accordance with the present invention.

The present invention relates to an apparatus for helping to protect a vehicle occupant and, in particular, to a fluid source usable for an inflatable seat belt. As representative of the present invention, FIG. 1 illustrates a length of seat belt webbing 18 that forms a seat belt 19 that is part of a three-point continuous loop seat belt system 13 for use in restraining an occupant of a vehicle 14.

During operation of the vehicle 14, an occupant of the vehicle sits on a seat 16, which is illustrated as a front passenger seat of the vehicle. The length of seat belt webbing 18 is extensible about the vehicle occupant. One end of the length of belt webbing 18 is anchored to the vehicle body 20 at an anchor point 22. The opposite end of the belt webbing 18 is attached to a retractor 24 secured to the vehicle body 20. Intermediate its ends, the belt webbing 18 passes through a tongue assembly 26 and a turning loop or D-ring 28. When the seat belt system 13 is not in use, the belt webbing 18 is wound on the retractor 24 and is oriented generally vertically on one side of the seat 16, as shown in solid lines in FIG. 1.

To engage the seat belt system 13, the tongue assembly 26 is manually grasped and is pulled across the lap and torso of the occupant sitting in the seat 16. As the tongue assembly 26 is pulled across the lap and torso of the occupant, the tongue assembly moves along the belt webbing 18, and the belt webbing is unwound from the retractor 24. When the belt webbing 18 has been pulled across the lap and torso of the occupant, the tongue assembly 26 is connected with a buckle 30, as shown in dashed lines in FIG. 1. The buckle 30 is disposed on the side of the seat 16 opposite the anchor point 22 and the retractor 24. When the seat belt system 13 is thus buckled, the length of belt webbing 18 that forms the seat belt 19 is divided by the tongue assembly 26 into an inflatable torso portion 32, which extends across the torso of the occupant, and a lap portion 34, which extends across the lap of the occupant. The lap portion 34 may also be inflatable.

The retractor 24 is fixed to the vehicle 14 in a known manner (not shown). The retractor 24 includes a belt webbing spool (not shown) supported for rotation about an axis in a belt retraction direction and in an opposite belt withdrawal direction. A rewind spring assembly (not shown) biases the belt webbing spool for rotation in the belt retraction direction.

The torso portion 32 of the belt webbing 18 may be inflated upon sensing a vehicle condition for which protection of an occupant of the seat 16 may be desired. Such a vehicle condition may be, for example, sudden vehicle deceleration above a predetermined deceleration, or withdrawal of belt webbing 18 from the retractor 24 at a rate exceeding a predetermined rate, such as can occur in a vehicle collision. Such a vehicle condition can also be a side impact to the vehicle or a rollover condition of the vehicle. A pretensioner 50 may also be operable to retract the belt webbing 18 into the retractor 24 upon sensing such a vehicle condition.

Figure 2:
FIG. 2 is a schematic diagram of a system for inflating the inflatable seat belt of FIG. 1.

The seat belt system 13 (FIG. 2) further includes a sensor 91 for sensing the occurrence of such a vehicle condition. The sensor 91 may be a mechanical sensor, which uses a member movable upon sudden vehicle deceleration and/or a side impact or a rollover condition to actuate an electric circuit. The sensor 91 may also be an electronic sensor, for example, a piezoelectric transducer or pressure sensor. The seat belt system 13 also includes a controller 92 that determines the existence of such a vehicle condition on the basis of parameters including vehicle speed, engine speed, road wheel speed, occupant position, etc.

Figure 3A:
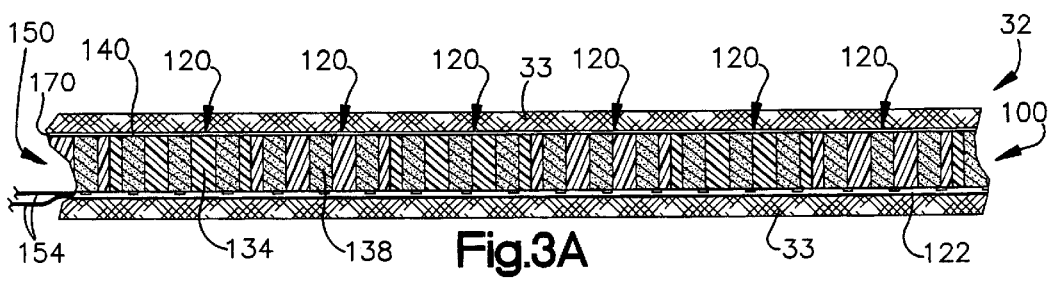
FIG. 3A is a schematic view of an inflatable seat belt that forms part of the seat belt system of FIG. 1.
Figure 3B:
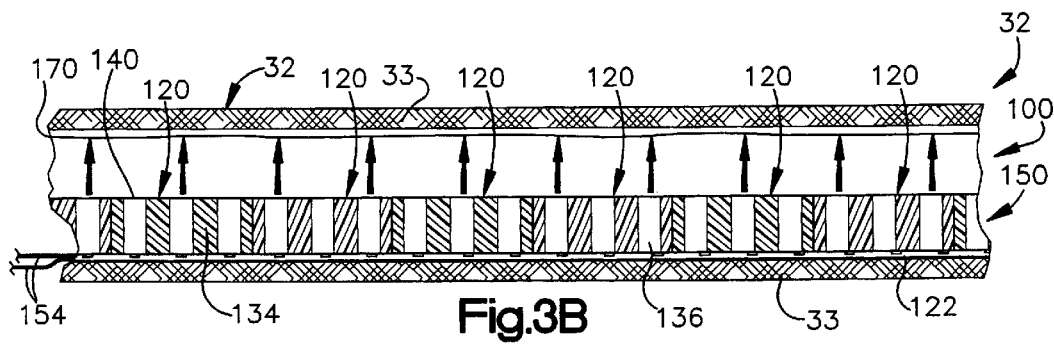
FIG. 3B is a schematic view of the inflatable seat belt of FIG. 3A under an inflated condition.

The seat belt system 13 includes a fluid source 100 (FIGS. 3A and 3B). The fluid source 100 is mounted within the torso portion 32 of the seat belt 19 between two layers 33 of seat belt webbing 18 so as to move flexibly with the belt webbing 18 during normal operating conditions of belt withdrawal and retraction. The fluid source 100, when actuated as described below, directs fluid under pressure into the torso portion 32 of the seat belt 19 thereby forming a cushion against impact to the torso of the occupant.

The fluid source 100 (FIGS. 4 and 5) comprises one or more microelectromechanical system (MEMS) devices 120. In the illustrated embodiment, each one of the MEMS devices 120 is configured as shown in FIGS. 4 and 5. Each one of the MEMS devices 120 is a multi-layered device that may be manufactured in a manner similar to that described in European Patent Application EP 0 903 487 A2, and in the article D. Lewis, et al., "Digital Micropropulsion", Sensors and Actuators A: Physical, Vol. 80, No. 2, Elsevier, March, 2000, p. 143–154.

Specifically, each MEMS device 120 includes a bottom layer or base 122. The base 122 is made from a flexible rectangular block of material the upper surface 124 of which includes electric circuitry 126. The electric circuitry 126 includes a plurality of individually energizable electric heating elements 128 connected with terminal pins 130. In the illustrated embodiment, the electric circuitry 126 includes nine individually energizable electric heating elements 128 connected with nine terminal pins 130. The nine heating elements 128 are spaced apart in a rectangular 3×3 array on the base 122.

The base 122 may be made using standard complementary metal oxide semiconductor (CMOS) processes. The base 122 may be made from a flexible composite layer including silicon or other suitable material. The base 32 may be made from silicon or other suitable material, such as polyimide or ceramic.

The heating elements 38 may be polysilicon resistors or other micro-resistors, such as nickel, niobium and niobium nitride. The heating elements 38 may, alternatively, be made as a reactive bridge. A reactive bridge is a wire form bridge of bimetallic construction that yields thermal energy when energized electrically, principally by the release of alloy or intermetallic heat of formation from the chemically reacted metals. Reactive bridges are shown in U.S. Pat. Nos. 2,911,504 and 3,503,814, and are available commercially from Sigmund Cohn Corp., 121 South Columbus Avenue, mount Vernon, N.Y., Internet site www.sigmundcohn.com, under the brand name PYROFUZE®. When the two metallic elements of the reactive bridge are brought to the initiating temperature by flow of electric current, they alloy rapidly resulting in instant deflagration without support of oxygen. The electric circuitry 126 on the base 122 may also include address and control electronics.

The MEMS device 120 also includes a flexible middle layer 132 formed on the base 122. The middle layer 132 includes a flexible propellant block 134. The propellant block 134 defines a series of cylindrical plenums or propellant chambers 136. In the illustrated embodiment, the propellant block 134 includes nine propellant chambers 136. The nine propellant chambers 136 are spaced apart in the propellant block 134 in the same rectangular 3×3 array as the nine heating elements 128 on the base 122. The heating elements 128 are associated in a one-to-one relationship with the propellant chambers 136 for, when energized, heating the contents of the propellant chambers.

Material selection for the propellant block 134 depends on the type and quantity of the propellant material used and the flexibility properties of the block material. A material that can be used to make very fine structures with tight tolerances and high aspect ratios (hole depth to hole width) is preferable. One suitable material for the propellant block 134 is hard anodized aluminum. Another suitable material is FOTURAN™ brand photosensitive glass. Foturan is a registered trademark of Schott Glaswerke of Mainz, Germany for its products made of glass or glass ceramic materials.

The middle layer 132 of the MEMS device 120 also includes, in each one of the chambers 136, contents that are heatable to increase the pressure in the chamber. In the illustrated embodiment, the contents of the chambers 136 are bodies 138 of a solid propellant material, or pyrotechnic material, which is actuatable, or ignitable, upon the application of heat, to produce fluid under pressure. Each propellant body 138 has a generally cylindrical configuration and substantially fills a respective one of the propellant chambers 136.

One suitable material for the propellant bodies 138 is zirconium potassium perchlorate, which is commonly used in igniters for air bag inflators. Another suitable material is potassium dinitrobenzofuroxan (KDNBF).

The MEMS device 120 also includes a flexible top layer or outer layer 140 having a plurality of individually rupturable segments or diaphragms 142, which serve as burst disks. The diaphragms 142 may be thin-walled portions of the outer layer 140. The nine diaphragms 142 are spaced apart in the flexible outer layer 140 in the same rectangular 3×3 array as the nine propellant chambers 136 and the nine heating elements 128.

The outer layer 140 may be made from a thin layer of metal. The diaphragms 142 may be thin portions of the metal layer. The outer layer 140 may be made from aluminum tape or KAPTON® brand tape. The diaphragms 142 may be thin silicon nitride remaining after an anisotropic wet etch through a silicon wafer. Other suitable materials include ceramics, such as silicon carbide, and metals. The three layers 122, 132 and 140 may be secured together by a known bonding method, with a high performance adhesive tape or an aerospace grade RTV adhesive.

The individual diaphragms 142 of the outer layer 140 are associated in a one-to-one relationship with the individual propellant chambers 136. Each diaphragm 142 closes a respective propellant chamber 136. Each one of the diaphragms 142 is rupturable due to an increase in pressure in its associated chamber 136 to enable flow of fluid out of the associated chamber.

The individual MEMS devices 120 may be mounted in an array 150, as shown in FIGS. 3A and 3B, which is disposed between the layers 33 of the torso portion 32 of the belt webbing 18. The bases 122 of all the MEMS devices 120 are electrically interconnected with each other. Lead wires 154 electrically connect the terminal pins 130 in the bases 122 with the controller 92.

An expandable layer 170 is bonded to the perimeter of the array 150, at the outer edges of the outer layers 140 of the outermost MEMS devices 120. The expandable layer 170 may be made from a layer of rubber or other suitable material.

Alternatively, the array 150 may have multiple expandable layers with an individual expandable layer, or bubble, bonded to the perimeter of the outer layers 140 of each MEMS device 120 in the array 150. As a further alternative, an individual expandable layer may be bonded around the perimeter of each diaphragm 142 of each MEMS device 120, for example, as shown in dashed lines at 270 in FIG. 6.

The assembly of the array 150 and the expandable layer 170 is placed within an envelope, or pocket, formed between the layers 33 of the torso portion 32 of the seat belt 19. The assembly may be secured to the interior surface of the envelope by a known method, or may remain loose in the envelope. The lead wires 154 of the array 150 are electrically connected to the controller 92.

In the event of a vehicle collision or other event for which inflating of the belt webbing 18 is desired, the controller 92 sends an actuation signal over the lead wires 154 to the array 150 including the MEMS devices 120. The controller 92 is operative to provide an actuation signal for energizing any selected one or more of the MEMS devices 120 of the array 150 in the torso portion 32, at a selected time. In addition, the controller 92 is operative to provide an actuation signal for energizing any selected one or more of the heating elements 128 within each one of the MEMS devices 120, at a selected time. Thus, the inflation of the torso portion 32 may be effectively "digital" in construction and operation. That is, the torso portion 32 comprises a very large number of discrete, individually actuatable fluid sources.

When an individual heating element 128 of one of the MEMS devices 120 is energized, the heating element generates heat, which is transmitted into the associated propellant body 138. The propellant body 138 ignites and generates a primary fluid under pressure in the associated propellant chamber 136. The increased pressure in the propellant chamber 136 causes the associated diaphragm 142 of the top layer 140 to rupture, which enables the primary fluid to flow out of the chamber.

The primary fluid is directed against the expandable layer 170. The flow of fluid causes the expandable layer 170 to stretch and move away from the outer layer 140 of the MEMS devices 120 of the array 150, as shown in FIG. 3B. The movement of the expandable layer 170 away from the array 150 is stopped by tension produced in the expandable layer 170. The elastic properties of the expandable layer 170, and/or the size of the envelope in the torso portion 32, determine how much the expandable layer and the torso portion can expand.

The rate and volume of flow of the primary fluid are dependent on, and vary with, the number of MEMS devices 120 that are energized, the number of propellant bodies 138 that are ignited, and the time at which each individual propellant body is ignited. For example, the flow of primary fluid is dependent on the volume of each propellant chamber 136, and the type and amount of propellant 138 disposed in the propellant chambers.

In the microthruster application described in European Patent Application EP 0 903 487 A2, each plenum or propellant chamber is about 1.5 mm high (axial length) and up to about 0.7 mm in diameter. When MEMS devices of this type serve as a primary fluid source for an inflatable seat belt webbing, the depth of each plenum chamber can be increased to up to 10 mm or more, and the diameter of each plenum chamber can be increased by at least a factor of two. In the present invention, each plenum or propellant chamber may be in the range of from about 1 mm to about 10 mm in height and in the range of from about 0.5 mm to about 4 mm in diameter. Also, a tapered chamber may be used, rather than a cylindrical chamber.

Increasing both the diameter and depth of a plenum chamber by those factors can increase the volume of the plenum chamber by a factor of 12. A MEMS device 120 for use in the inflatable seat belt webbing 18, having an array comprising three to fifteen plenum chambers, may have a size in the range of about one-quarter inch square to one inch square (in length and width). A plurality of individually actuatable MEMS devices of this size can provide a fluid source having fluid flow sufficient to inflate the torso portion 32 of the seat belt webbing 18, as desired.

The inflatable seat belt 19 in accordance with the present invention can include a very large number of propellant bodies 138, thus enabling a substantial range of tailoring of the fluid flow inflating the seat belt 19. The controller 92 can control the rate of fluid flow inflating the seat belt 19 over a period of time, by selectively causing the ignition of any one or more of a plurality of propellant bodies 138 over a selected period of time. The controller is operative, in a known manner, to actuate the propellant bodies 138 all at once or in any controlled sequence depending on information about the vehicle condition and occupant information received from appropriate sensors 91 forming part of the vehicle electric circuitry.

It is possible to use a fluid propellant, rather than a solid propellant, in MEMS devices for inflating the seat belt 19. Additionally, to avoid making a complex housing having numerous welds to contain fluid, such a MEMS device may include a plurality of individual containers of fluid, inserted into chambers in a single propellant block. The fluid containers may directly replace the solid propellant bodies in an arrangement similar to FIG. 4.

Figure 6:
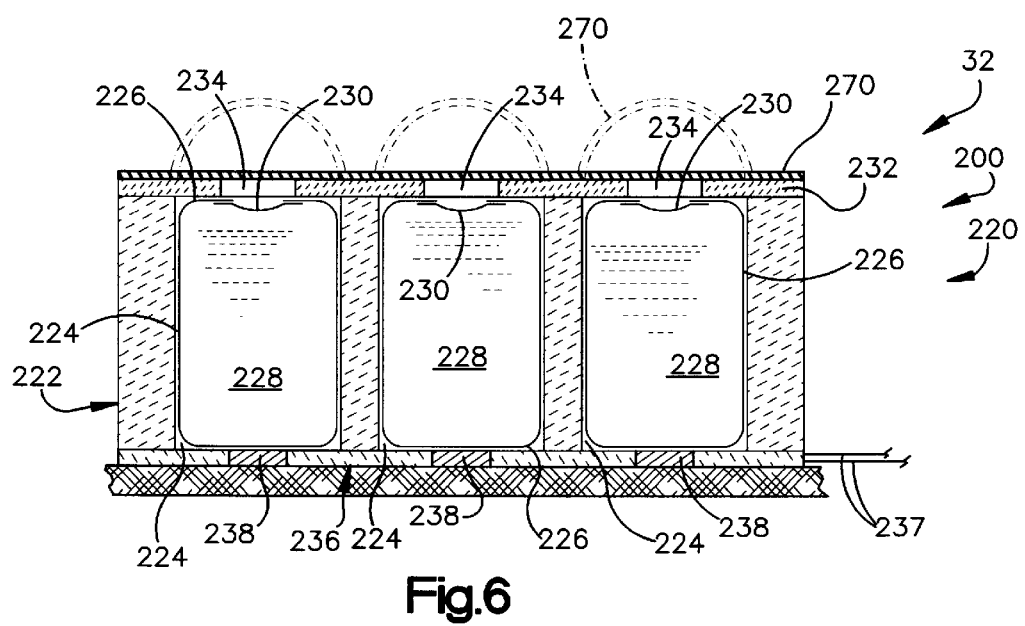
FIG. 6 is a schematic sectional view of a MEMS device in accordance with another feature of the present invention.

As an example, FIG. 6 illustrates schematically an inflatable seat belt fluid source 200 constructed in accordance with a second embodiment of the invention. The fluid source 200 may be substituted for the fluid sources 100 (FIGS. 3A and 3B) in the array 150 in the torso portion 32 of the inflatable seat belt 19.

The fluid source 200 (FIG. 6) includes a MEMS device 220. The MEMS device 220 includes a housing 222, which defines nine chambers 224, only three of which are shown. A respective container 226 is located in each chamber 224. Each container 226 contains a fluid 228. The fluid 228 may be a gas or a liquid, possibly under pressure. Each container 226 is sealed by a rupturable wall portion 230, such as a burst disk.

A manifold or top layer 232 and an expandable layer 270 extend across the top of the housing 222. The manifold 232 has a plurality of fluid outlets 234, which are aligned in a one-to-one relationship with the rupturable wall portions 230 of the containers 226.

The MEMS device 220 includes a base 236, which has lead wires 237 electrically connected with a plurality of heating elements 238. The heating elements 238 are associated in a one-to-one relationship with the containers 226. The combination of the heating elements 238 and the containers 226 form the MEMS device 220. The lead wires 237 are also electrically connected with vehicle electric circuitry.

In the event of a vehicle collision or other event for which inflating of the seat belt 19 is desired, vehicle electric circuitry sends an actuation signal over the lead wires 237 to the MEMS device 220. The vehicle electric circuitry is operable to provide an actuation signal for energizing any selected one or more of the containers 226.

When a container 226 is energized, its associated heating element 238 generates heat, which is transmitted into the container 226. The fluid 228 in the container 226 is heated and increases in pressure. For example, if the fluid 228 is a liquid, it may be vaporized to a gaseous state. The increased pressure causes the associated rupturable wall portion 230 of the container 226 to rupture, enabling the fluid 228 to flow against and expand the expandable layer 270 as a primary fluid for the inflatable seat belt 19. As illustrated in FIG. 6, the expandable layer 270 comprises a plurality of portions associated on a one-to-one basis with the containers 226, as discussed above.

The rate and volume of flow of the fluid 228 are dependent on, and vary with, the number of containers 226 that are energized, and the time of actuation of each individual container 226. Therefore, the vehicle electric circuitry can control the output of the MEMS device 220, both in time and duration, by selectively energizing any one or more of a plurality of the containers 226 of the MEMS devices 220 over a selected period of time.

Figure 7:
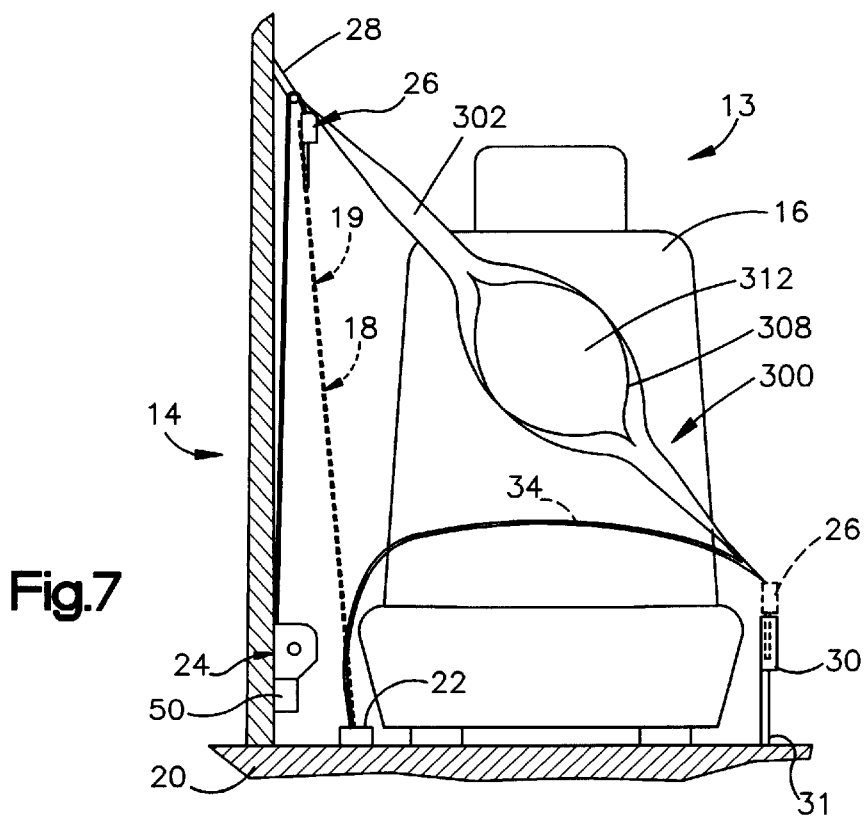
FIG. 7 is a view similar to FIG. 1 of a vehicle seat belt system including an inflatable seat belt in accordance with a second embodiment of the invention; and, FIG. 8 is a schematic sectional view of the seat belt of FIG. 7.
Figure 8:
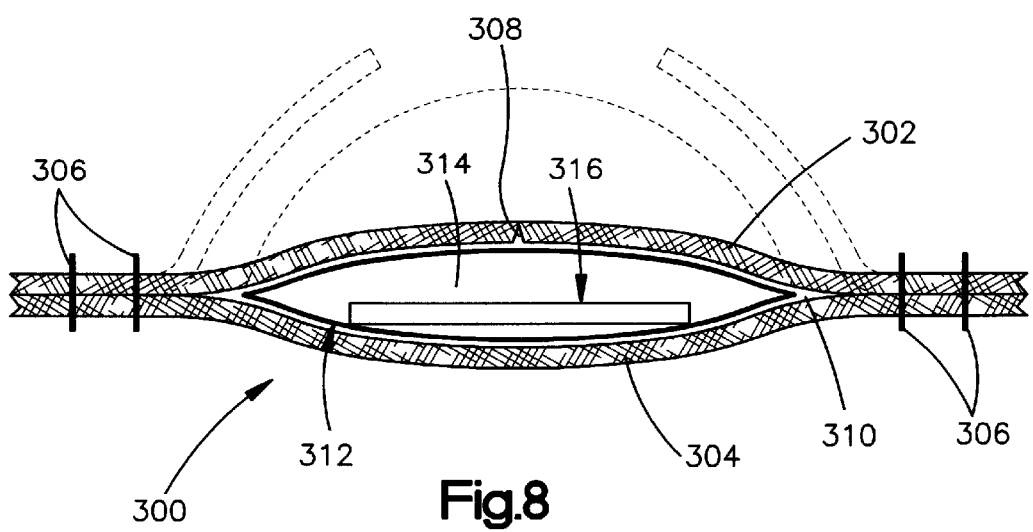

FIGS. 7 and 8 illustrate a seat belt 300 constructed in accordance with a second embodiment of the invention. In contrast to the seat belt 19 (FIGS. 1–6), the seat belt 300 includes an inflatable portion that emerges through a rupturable portion of webbing to define an inflated air bag in front of a vehicle occupant. The seat belt 300 is illustrated in FIG. 7 as being incorporated in the seat belt system 13 in place of the seat belt 19.

Specifically, the seat belt 300 (FIG. 8) includes two layers 302 and 304 of belt webbing or other material for resisting the load of the vehicle occupant in a vehicle collision. The webbing layers 302 and 304 are joined at their edges by non-rupturing stitching sections 306. The webbing layer 302 has a rupturable portion, or tear seam, 308 located approximately in the middle of the webbing. The rupturable portion 308 extends along a portion of the length of the webbing layer 302, as shown in FIG. 7.

The webbing layers 302 and 304 define a chamber 310 (FIG. 8) in the seat belt 300. An inflatable layer, or bladder, 312 is located in the chamber 310 in the seat belt 300. The bladder 312 defines an inflation fluid chamber 314. A MEMS inflation fluid source illustrated schematically at 316 is located in the inflation fluid chamber 314 in the bladder 312. The MEMS inflation fluid source 316 may be made in accordance with the embodiments of the invention illustrated in FIGS. 1–6.

In the event of a vehicle collision or other event for which inflating of the seat belt is desired, an actuation signal is sent to the MEMS inflation fluid source 316. One or more of the MEMS devices in the MEMS inflation fluid source 316 is energized, producing inflation fluid under pressure in the inflation fluid chamber 314 of the bladder 312. The pressure causes the bladder 312 to expand outward against the webbing layers 302 and 304. The force of the inflating bladder 312 ruptures the rupturable portion 308 of the webbing layer 302. The bladder 312 emerges from the seat belt 300 and defines an inflated air bag in front of the occupant, as shown in FIG. 7, to help protect the occupant.

The MEMS heating element may, alternatively, be a reactive bridge. A reactive bridge is a wire form bridge of bimetallic construction that yields thermal energy when energized electrically, principally by the release of alloy or intermetallic heat of formation from the chemically reacted metals. Reactive bridges are shown in U.S. Pat. Nos. 2,911, 504 and 3,503,814, and are available commercially from Sigmund Cohn Corp., 121 South Columbus Avenue, mount Vernon, N.Y., Internet site www.sigmundcohn.com, under the brand name PYROFUZE®. When the two metallic elements of the reactive bridge are brought to the initiating temperature by flow of electric current, they alloy rapidly resulting in instant deflagration without support of oxygen.

One advantage of using a reactive bridge is that it generates and disperses so much heat that it need only be close to (and not in intimate contact with) the material that it is to ignite (such as solid propellant). A resistive heating element, on the other hand, must be maintained in intimate contact with the material being ignited. The reactive bridge can be deposited on the MEMS base layer by a number of different methods.

From the above description of the invention, those skilled in the art will perceive improvements, changes and modifications in the invention. For example, the layer 170 may be replaced by an inflatable bladder that encloses the MEMS devices 120 or 220. Such improvements, changes and modifications within the skill of the art are intended to be covered by the appended claims.

Having described the invention, we claim:

1. A vehicle seat belt system comprising:
    a seat belt for helping to protect a vehicle occupant, said seat belt including an inflatable portion; and
    at least one microelectromechanical device (MEMS device) connected in fluid communication with said inflatable portion of said seat belt and energizable to supply inflation fluid to inflate said inflatable portion of said seat belt.

2. A seat belt system as set forth in claim 1 comprising a plurality of MEMS devices individually energizable to supply inflation fluid to inflate said inflatable portion, and further including means for selectively controlling energizing of said plurality of MEMS devices to control the flow of inflation fluid to said inflatable portion.

3. A seat belt system as set forth in claim 1 wherein said MEMS device includes a solid pyrotechnic material that is ignited upon energizing of said MEMS device to produce said inflation fluid.

4. A seat belt system as set forth in claim 1 wherein said MEMS device includes a quantity of fluid that is heated and pressurized upon energizing of said MEMS device to produce said inflation fluid.

5. A seat belt system as set forth in claim 1 wherein said MEMS device has a size in the range of from about one-quarter inch square to about one inch square and includes an array of at least three plenum chambers.

6. A seat belt system as set forth in claim 1 wherein said seat belt is at least partially formed of webbing and said inflatable portion when inflated moves said webbing to expand the size of said seat belt.

7. A seat belt system as set forth in claim 1 wherein said seat belt is at least partially formed of webbing and said inflatable portion inflates at least partially outside said webbing.

8. A vehicle seat belt comprising:
    an expandable layer movable by inflation fluid to inflate at least a portion of said seat belt; and
    at least one multi-layered device for providing said inflation fluid to move said expandable layer, said multi-layered device including:
        an outer layer having a plurality of individually rupturable segments;
        a middle layer having a plurality of individual chambers associated in a one-to-one relationship with said rupturable segments of said outer layer and being closed by said rupturable segments, each one of said chambers having contents heatable to increase the pressure in said one chamber; and
        a flexible base layer having a plurality of individually energizable electric heating elements associated in a one-to-one relationship with said chambers for, when energized, heating the contents of said chambers;

each one of said rupturable segments being rupturable due to an increase in pressure in its associated chamber to enable flow of said inflation fluid out of said chamber; and means for selectively energizing said individually energizable electric heating elements.

9. A seat belt as set forth in claim 8 wherein each of said plurality of chambers is in the range of from about 0.5 mm to about 4 mm in diameter and in the range of from about 1 mm to about 10 mm in height.

10. A seat belt as set forth in claim 8 wherein said contents of said chambers are heatable at different times to selectively control inflation of said portion of the seat belt.

11. A seat belt as set forth in claim 8 wherein said multi-layered device includes a solid pyrotechnic material that is ignited to produce said inflation fluid.

12. A seat belt as set forth in claim 8 wherein said seat belt is at least partially formed of webbing and said expandable layer when inflated moves said webbing to expand the size of said seat belt.

13. A seat belt as set forth in claim 8 wherein said seat belt is at least partially formed of webbing and said expandable layer inflates at least partially outside said webbing.

14. An inflatable seat belt comprising an expandable at least one multi-layered device, said multi-layered device comprising:

an outer layer having a plurality of individually rupturable segments;

a flexible middle layer having a plurality of individual chambers associated in a one-to-one relationship with said rupturable segments of said outer layer and being closed by said rupturable segments, each one of said chambers having contents heatable to increase the pressure in each one of said chambers;

a base layer having a plurality of individually energizable electric heating elements associated in a one-to-one relationship with said chambers for, when energized, heating the contents of said chambers;

each one of said rupturable segments being rupturable due to an increase in pressure in its associated chamber to enable flow of fluid out of said chamber; and means for selectively energizing said individually energizable electric heating elements.

15. An inflatable seat belt as set forth in claim 14 wherein said multi-layered device has a size in the range of from about one-quarter inch square to about one-half inch square.

16. An inflatable seat belt as set forth in claim 14 wherein said heatable contents comprise a pyrotechnic material that is ignitable to produce fluid under pressure.

17. An inflatable seat belt as set forth in claim 14 wherein said heatable contents comprises a fluid that is heatable to increase its pressure.

18. An inflatable seat belt as set forth in claim 14 wherein said electric heating elements are micro-resistors.

19. An inflatable seat belt as set forth in claim 14 wherein said electric heating elements are reactive bridges.

20. An inflatable seat belt as set forth in claim 14 wherein said seat belt is at least partially formed of webbing and said expandable layer when inflated moves said webbing to expand the size of said seat belt.

21. An inflatable seat belt as set forth in claim 14 wherein said seat belt is at least partially formed of webbing and said expandable layer inflates at least partially outside said webbing.

22. An inflatable seat belt comprising:

an expandable layer and an array of individually energizable devices for producing combustion products for inflating said seat belt; and means for energizing selected ones of said energizable devices, said energizing means including a flexible base that extends across said array and a plurality of electric heating elements associated one with each of said energizable devices, said energizing means further comprising control means for directing electric current into selected ones of said plurality of electric heating elements to energize said selected ones of said energizable devices.

23. An inflatable seat belt as set forth in claim 22 wherein said electric heating elements are resistors made using a complementary metal oxide semiconductor (CMOS) process.

24. An inflatable seat belt as set forth in claim 22 wherein said electric heating elements are reactive bridges.

25. An inflatable seat belt as set forth in claim 22 wherein said seat belt is at least partially formed of webbing and said expandable layer when inflated moves said webbing to expand the size of said seat belt.

26. An inflatable seat belt as set forth in claim 22 wherein said seat belt is at least partially formed of webbing and said expandable layer inflates at least partially outside said webbing.

* * * * *